(12) United States Patent
Kalkbrenner et al.

(10) Patent No.: US 10,247,934 B2
(45) Date of Patent: Apr. 2, 2019

(54) METHOD FOR EXAMINING A SPECIMEN BY MEANS OF LIGHT SHEET MICROSCOPY

(71) Applicant: Carl Zeiss Microscopy GmbH, Jena (DE)

(72) Inventors: Thomas Kalkbrenner, Jena (DE); Helmut Lippert, Jena (DE); Joerg Siebenmorgen, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 87 days.

(21) Appl. No.: 15/537,424

(22) PCT Filed: Nov. 18, 2015

(86) PCT No.: PCT/EP2015/076939
§ 371 (c)(1),
(2) Date: Jun. 18, 2017

(87) PCT Pub. No.: WO2016/096303
PCT Pub. Date: Jun. 23, 2016

(65) Prior Publication Data
US 2018/0267289 A1      Sep. 20, 2018

(30) Foreign Application Priority Data
Dec. 19, 2014   (DE) .................. 10 2014 119 255

(51) Int. Cl.
*H04N 9/47*       (2006.01)
*H04N 7/18*       (2006.01)
(Continued)

(52) U.S. Cl.
CPC ....... *G02B 21/367* (2013.01); *G02B 21/0032* (2013.01); *G02B 21/10* (2013.01); *G02B 21/16* (2013.01); *G06T 2207/10056* (2013.01)

(58) Field of Classification Search
CPC .. G02B 21/367; G02B 21/0032; G02B 21/10; G02B 21/16; G06T 2207/10056
(Continued)

(56) References Cited

U.S. PATENT DOCUMENTS

2006/0033987 A1    2/2006   Stelzer et al.
2010/0265575 A1*  10/2010   Lippert .................. G02B 21/16
                                                                  359/385
(Continued)

FOREIGN PATENT DOCUMENTS

DE        10257423 A1     6/2004
DE     102007063274 A1    6/2009
(Continued)

OTHER PUBLICATIONS

V. Kettunen et al., "Propagation-invariant spot arrays", Optics Letters 23(16), 1247-1249, Aug. 15, 1998, 3 pages.
(Continued)

*Primary Examiner* — Jared Walker
(74) *Attorney, Agent, or Firm* — Skaar Ulbrich Macari, P.A.

(57) ABSTRACT

A method for examining a specimen via light sheet microscopy includes selecting several illumination wavelengths for the specimen. To structure the illumination light, a predefined phase distribution is impressed on the phase-selective element and a predefined aperture structure is impressed on an aperture in the aperture plane. The phase-selective element is then illuminated in an intermediate image plane in an illumination beam path with illumination light, which is structured by the phase-selective element. The structured illumination light is imaged into an aperture plane arranged downstream of the phase-selective element. The aperture structure is adapted such that the zero orders of the structured illumination light in the aperture plane are substan-
(Continued)

tially removed. The specimen is illuminated with the structured light sheet in the light sheet plane. Light emitted by the specimen is detected in a detection direction which forms an angle different from zero with the light sheet plane.

9 Claims, 3 Drawing Sheets

(51) Int. Cl.
*G02B 21/36* (2006.01)
*G02B 21/00* (2006.01)
*G02B 21/10* (2006.01)
*G02B 21/16* (2006.01)

(58) Field of Classification Search
USPC .......................................................... 348/79
See application file for complete search history.

(56) References Cited

U.S. PATENT DOCUMENTS

| | | | |
|---|---|---|---|
| 2013/0286181 A1 | 10/2013 | Betzig et al. | |
| 2015/0022881 A1* | 1/2015 | Loza Alvarez | G02B 21/06 359/385 |
| 2015/0168732 A1 | 6/2015 | Singer et al. | |
| 2015/0192767 A1* | 7/2015 | Li | G02B 21/18 348/79 |
| 2015/0198794 A1* | 7/2015 | Rondeau | G02B 21/0048 359/390 |
| 2015/0205087 A1 | 7/2015 | Schumann | |
| 2015/0253560 A1* | 9/2015 | Otte | G02B 21/0032 359/385 |

FOREIGN PATENT DOCUMENTS

| | | |
|---|---|---|
| EP | 2806262 A1 | 11/2014 |
| WO | 2012110488 A1 | 8/2012 |
| WO | 2012122027 A1 | 9/2012 |
| WO | 2014005682 A1 | 1/2014 |
| WO | 2014017067 A1 | 1/2014 |
| WO | 2014026683 A1 | 2/2014 |

OTHER PUBLICATIONS

F.O. Fahrbach et al., "A line scanned light-sheet microscope with phase shaped self-reconstructing beams", Optics Express vol. 18, No. 23, 24229-24244, Nov. 8, 2010, 16 pages.

M. Zhao et al., "Cellular imaging of deep organ using two-photon Bessel light-sheet nonlinear structured illumination microscopy", Biomedical Optics Express, vol. 5, No. 5, 1296-1308, May 1, 2014, 13 pages.

L. Runze et al., "Selective plane illumination microscopy with structured illumination based on spatial light modulators", Progress in Biomedical Optics and Imaging, SPIE—International Society for Optical Engineering, vol. 8949, 89491S-1-89491S-5, Mar. 12, 2014, 5 pages.

The German Search Report rendered by the German Patent and Trade Mark Office (DPMA) for German Patent Application No. 10 2014 119 255.9, dated Feb. 4, 2015, 9 pages.

The International Search Report and written opinion rendered by the International Searching Authority for PCT/EP2015/076939, dated Feb. 18, 2016, 12 pages.

\* cited by examiner

METHOD FOR EXAMINING A SPECIMEN BY MEANS OF LIGHT SHEET MICROSCOPY

PRIORITY

This application claims the benefit of German Patent Application No. 102014119255.9 filed on Dec. 19, 2014, which is hereby incorporated herein by reference in its entirety.

FIELD

The invention relates to a method for examining a specimen by means of light sheet microscopy and addresses, among other things, the problem of analysing specimens which are marked with several dyes.

BACKGROUND

The examination of biological specimens, in which the illumination of the specimen is effected by means of a light sheet, the plane of which—the light sheet plane—intersects the optical axis of the detection—the detection direction—at an angle different from zero, has recently gained importance. The light sheet plane usually forms an angle different from zero, often—but not imperatively—a right angle, with the detection direction, which as a rule corresponds to the optical axis of the detection objective. Such examination methods are predominantly used in fluorescence microscopy and are subsumed under the term LSFM (Light Sheet Fluorescence Microscopy). An example is the method described in DE 102 57 423 A1 and WO 2004/0535558 A1, which is based thereon, and called SPIM (Selective Plane Illumination Microscopy), with which even relatively thick specimens can be spatially recorded in a relatively short time: a visually/spatially extensive representation of the specimen is possible on the basis of optical sections combined with a relative movement in a direction perpendicular to the sectional plane.

Compared with other established methods, such as confocal laser scanning microscopy or two-photon microscopy, LSFM methods have several advantages. As the detection can be effected in wide-field, larger specimen regions can be covered. Although the resolution is slightly lower than in confocal laser scanning microscopy, thicker specimens can be analysed with the LSFM technique, as the penetration depth is greater. In addition the light load on the specimen is at its lowest in this method, which reduces the risk of bleaching of a specimen as the specimen is only illuminated by a thin light sheet at an angle to the detection direction different from zero.

Instead of a purely static light sheet, a quasi-static light sheet can also be generated by rapidly scanning the specimen with a light beam. The light sheet-type illumination is formed by subjecting the light beam to a very rapid movement relative to the specimen to be observed and stringing several together sequentially over time. The integration time of the camera, onto the sensor of which the specimen is imaged, is chosen such that the scanning is completed within the integration time.

One of the main applications of light sheet microscopy is the imaging of medium-sized organisms of from several 100 μm to a few mm. As a rule these organisms are embedded in a gel, for example agarose, which is in turn located in a glass capillary tube. The glass capillary tube is introduced into a water-filled specimen chamber from above or from below and the specimen presses a piece out of the capillary. The specimen in the agarose is illuminated with a light sheet and the fluorescence is imaged onto a camera by means of a detection objective which—preferably, but not imperatively—is perpendicular to the light sheet and thus also perpendicular to the illumination objective of an optical system for generating a light sheet.

This method of light sheet microscopy, however, is subject to certain limitations. Firstly, the specimens to be examined are relatively large, they originate from developmental biology. Secondly, because of the specimen preparation and the dimensions of the specimen chamber, the light sheet is relatively thick and thus the achievable axial resolution is limited. Thirdly, the preparation of the specimens is laborious and not compatible with standard specimen preparations and standard specimen holders, such as are usual in fluorescence microscopy for individual cells.

In order to partially avoid these limitations, in recent years a novel structure has been implemented, in which the illumination objective and the detection objective are preferably perpendicular to each other and are directed onto the specimen from above at an angle of 45°. Such procedures are described, for example, in WO 2012/110488 A1 and in WO 2012/122027 A1.

As a rule coherent light of a laser is used to illuminate the specimen. In fluorescence microscopy the wavelength of the light is chosen depending on markers which are to be excited to emit fluorescence. In the simplest case, for example, a light beam with an intensity profile which corresponds to a Gaussian function can be shaped into a light sheet statically by means of cylindrical lenses, or quasi-statically by means of scanning and matched integration time of the camera. A structured illumination of the specimen, which can increase the resolution, is advantageous. Thus, for example, the coherent superimposition of Bessel beams is described in an article by V. Kettunen et al., "*Propagation-invariant spot arrays*", published in Optics Letters 23(16), page 1247, 1998. The superimposition is achieved by calculating a phase element which can be introduced into the pupil with the aid of an algorithm. If the spectrum of a Bessel beam is imaged into the pupil, the phase element generates a plurality of Bessel beams which are superimposed in the specimen. The phase element is similar to a star-shaped grating with the phase values 0 and $\pi$. It is specified as a condition that the distances between the individual Bessel beams must be great as, otherwise, undesired interference effects can result.

In US 2013/0286181 A1 the interference effects between the individual Bessel beams are used in a targeted manner in order to generate an extensive and structured light sheet. Here, the Bessel beams are placed side by side so closely that the side lobes of the individual Bessel beams are destructively superimposed above and below the propagation plane, the light sheet plane. Depending on the distance of the individual Bessel beams from each other, different interference patterns result.

The generation of so-called $sinc^3$ beams is described in WO 2014/005682 A1. An almost box-shaped light sheet with only small side lobes can thus be generated in the specimen. The $sinc^3$ beam can be described in the frequency domain as the product of three $sinc^3$ functions:

$$f = f_{vr} f_{vx} f_{vy}$$

with $$f_{vr}(v_r) = \operatorname{sinc}\left[\frac{(v_r - c_r)^2}{w_z}\right], f_{vx}(v_x) = \operatorname{sinc}\left[\frac{(v_x - c_x)^2}{w_x}\right],$$

$$f_{vy}(v_y) = \operatorname{sinc}\left[\frac{(v_y - c_y)^2}{w_y}\right]$$

and $$v_r(v_x, v_y) = \sqrt{v_x^2 + v_y^2}.$$

The coefficients $c_r$, $c_x$ and $c_y$ indicate the position of the $\operatorname{sinc}^3$ beam in the pupil plane, the coefficients $w_x$, $w_y$ and $w_z$ indicate the width of the $\operatorname{sinc}^3$ beam in the respective direction.

The Fourier transform of this function f yields the complex electric field EF of the light sheet. The intensity distribution I in the focus results from I=abs(EF)$^2$, the phase φ results at φ=arg(EF). $\operatorname{Sinc}^3$ beams can also be superimposed coherently, with the result that a structured, grating-type light sheet forms.

To generate the above-described beam types, for example, spatial light modulators (SLMs) can be used. For Bessel beams, for example, this is described in an article by Rohrbach et al., "*A line scanned light-sheet microscope with phase shaped self-reconstructing beams*", published in Optics Express 18, page 24229 in 2010. There are two types of spatial light modulators, which differ by the liquid crystals used.

Nematic SLMs make a maximum continuously adjustable phase deviation from 0 up to 6π possible. However, these SLMs are relatively slow: as a rule, they have frame rates of about 60 Hz, at most of up to 500 Hz. In contrast the diffraction efficiency of nematic SLMs is over 90%.

On the other hand, there are ferroelectric SLMs, which can only switch back and forth between states without a phase deviation and with a phase deviation of π. For this, these SLMs are very rapidly switchable, with the result that frame rates of up to 4000 Hz can be achieved. However, the diffraction efficiency, at about 14%, is very low.

Both SLM types have in common the fact that the achievable phase deviation depends on the wavelength of the irradiated laser light. A nematic SLM should ideally be calibrated such that it has a continuous phase deviation from 0 up to an entire wavelength, thus 2π. This phase deviation can, however, only be set at a single wavelength, for which it is then designed. As soon as the SLM is irradiated with a laser of a different wavelength, the phase deviation changes and is not equal to 2π. At a shorter wavelength the phase deviation becomes larger, at a longer wavelength the phase deviation decreases.

The behaviour of a ferroelectric SLM is similar. Here too, the phase deviation of π is only achieved at the wavelength for which the pattern represented on the SLM is designed. At different wavelengths the phase deviation differs from π. This has direct effects on the generation of the above-named Bessel or $\operatorname{sinc}^3$ beams, thus these beams can be generated optimally only when the phase deviation continuously varies between 0 and 2π, as is necessary for Bessel and Mathieu beams, or when the phase deviation is exactly π, as is the case for coherently superimposed Bessel or $\operatorname{sinc}^3$ beams.

For analysis by means of fluorescence microscopy, a specimen is often prepared with different markers which can each make different regions of the specimen visible. It is therefore desirable to excite the specimen with light sheets of different wavelengths in light sheet microscopy. When a spatial light modulator is used for the beam shaping, an optimal multi-colour excitation can be implemented if the individual differently coloured light sheets are irradiated sequentially and the phase pattern is adapted to the SLM when the wavelength changes. For example, in a first pass the SLM is set to a first laser wavelength and an image stack is recorded in the z direction, the detection direction, at this wavelength. After that the SLM is set to a second wavelength and once again an image stack is recorded at this wavelength. However, this method has the disadvantage that the recording of the image stack can last a relatively long time, up to several tens of seconds. If the specimen moves or changes during this time, the differently coloured image stacks no longer match and cannot be combined into a total image.

Alternatively, each individual image of the image stack can first be recorded with the different wavelengths before the next image of an image stack is recorded. However, this has the disadvantage that with illumination times of about 10 ms the optimization of the spatial light modulator to the new laser wavelength must take place about 100 times a second. With normal nematic SLMs this cannot be achieved, with the result that ferroelectric SLMs, with their low light efficiency and the limited phase deviation, must be used.

SUMMARY

An object of the invention includes providing a method which makes it possible to illuminate a specimen with a multi-coloured light sheet of different wavelengths simultaneously or quasi-simultaneously over a very short time with static phase modulation, with the result that several colours can be detected at the same time and the duration of recording is reduced compared with a sequential excitation, wherein nematic SLMs are preferably also to be used because of their high diffraction efficiency.

The disclosure includes a method for examining a specimen by means of light sheet microscopy, by selecting several illumination wavelengths, of which illumination light for the specimen is composed. For a middle wavelength the modulation depth of a phase-selective element is then fixed at π. The middle wavelength can be the middle one of the wavelengths used, in order to obtain similar conditions for the entire range from which the wavelengths are selected, but it is advantageous to use the average of the longest and the shortest wavelength as the middle wavelength. The middle wavelength can, however, also be fixed using other criteria, for example it can match the wavelength of a laser which has a lower output compared with other lasers used at the same time for other wavelengths and for which, therefore, a high diffraction efficiency with losses that are as small as possible is desirable.

To structure the illumination light, a predefined phase distribution is impressed on the phase-selective element and a predefined aperture structure is impressed on an aperture in the aperture plane. For this, in a first step, a preferred wavelength is selected. As a rule this is selected from a wavelength range which as a rule also comprises the wavelengths which are used for the illumination of the specimen, i.e. the corresponding laser lines which are provided for exciting the fluorescence markers. The preferred wavelength can, however, also lie outside the wavelength range. However, as a rule, it corresponds to the longest illumination wavelength or is even longer than it.

For this preferred wavelength, in the focal plane of the illumination objective, for a light sheet of predefined shape its electric field is now determined by means of light of the preferred wavelength. The phase distribution to be predefined is calculated from this, it is the argument of the complex electric field, $\varphi=\arg(EF)$ with the phase $\varphi$. For the determination or calculation of the electric field of the light sheet, it is assumed that for the preferred wavelength a middle or central range is faded out in the aperture plane, in order to likewise exclude from the calculation the zero order which in reality must be removed to generate a structured light sheet. The calculation of the electric field in the focus of the illumination objective can, for example, be effected via a Fourier transform of the so-called pupil function, i.e. of the electric field in the frequency domain, here its distribution in the pupil. The calculated phase distribution is then impressed on the phase-selective element, which is preferably located in the intermediate image. If this is a static phase-selective element, such as for example a phase plate, this is produced accordingly. Controllable phase-selective elements, such as for example spatial light modulators, are controlled and set accordingly.

Optionally, further adjustment measures can be carried out. For example the phase distribution can be multiplied by an envelope function perpendicular to the light sheet plane, in this way the thickness of the light sheet can be set, in addition side lobes perpendicular to the light sheet plane can be suppressed. The phase distribution can also be adapted for impressing on the phase-selective element by dimensional scaling such that the spectrum in the pupil corresponds to the initially calculated spectrum, or the light sheet in the specimen has predefined dimensions.

The phase-selective element is then illuminated in or close to an intermediate image plane in an illumination beam path with illumination light and the illumination light is structured by the phase-selective element. The structured illumination light is imaged into an aperture plane arranged downstream of the phase-selective element, in which a frequency spectrum of the illumination light is generated. An adaptation of the aperture structure is then effected such that the zero orders of the structured illumination light in the aperture plane are substantially removed, whereby in a focal plane of a downstream illumination objective a multi-coloured, structured light sheet is formed, with a light sheet plane which is perpendicular to the focal plane of the illumination objective. The specimen is then illuminated with the structured light sheet in the light sheet plane and light emitted by the specimen is detected in a detection direction which forms an angle different from zero with the light sheet plane.

The aperture in the aperture plane can be further adapted in a different way. If, for example, a dimensional scaling is carried out, an aperture adjustment can ensure that precisely the zero orders of the superimposed light are removed. Another possibility for adjusting the aperture is to remove undesired side lobes of the pupil function.

In this way, an illumination apparatus for light-sheet microscopy is adjusted such that when light of the preferred wavelength is used it generates a light sheet structured in the best possible way for this preferred wavelength and the light sheet likewise has a high quality for the remaining wavelengths, in particular with regard to the structuring. An excitation of the specimen with several wavelengths simultaneously or quasi-simultaneously is thus made possible.

The input beam, for example a Gaussian laser beam, can preferably be collimated elliptically in order on the one hand to keep the light output in a zero order as low as possible and on the other hand to influence the light sheet only as little as possible.

For example a diffractive optical element can be used as phase-selective element. This can be formed statically as a phase plate and adapted once to a particular wavelength. Different phase plates can then be introduced into the beam path for different combinations of wavelengths. Another possibility is to use a spatial light modulator (SLM) as diffractive optical element. This offers the advantage that, via a control, it can be set to different preferred wavelengths and illumination wavelengths without a change being necessary; in addition different beam shapes for the light sheet can be implemented with an SLM. During the analysis of the specimen, however, the properties of the spatial light modulator (SLM) are not altered, the SLM behaves statically.

If an SLM is used easier adaptations in the beam path itself can be carried out, for example different envelope functions in the direction perpendicular to the light sheet plane can be multiplied by the phase distribution and further settings are thus carried out. A dimensional scaling can also be carried out more easily on an SLM.

While a beam with a Gaussian intensity profile is often used as input beam, which is collimated and directed onto the phase-selective element, for the calculation of the electric field of the light sheet shapes are preferably applied which are better suited to a uniform illumination or structured illumination of the specimen than such a Gaussian light beam, which can of course likewise be used to calculate the electric field of the light sheet.

In a preferred embodiment of the invention, the electric field of the light sheet is determined by using two $\text{sinc}^3$ beams, which are coherently superimposed in the focal plane of the illumination objective, to shape the light sheet. Here, the electric field of the light sheet in the specimen, i.e. in the focal plane, is calculated by Fourier transform starting from the above-specified pupil function. The phase is determined from the electric field resulting in the focal plane, the superimposition field, and impressed on the phase-selective element. An important advantage of $\text{sinc}^3$ beams is that they can be used to form an almost box-shaped light sheet with uniform illumination in the specimen, with only small side lobes. In the case of coherent superimposition a structured, grating-like light sheet can be generated.

In another preferred embodiment, the electric field of the light sheet is determined by using Bessel beams of a predefined shape to shape the light sheet. For such a Bessel beam the electric field in the focal plane is determined and a superimposition of this electric field and identical electric fields which are spaced apart from each other in each case by a predefined amount A in the focal plane is arithmetically determined. The distance $\Delta$ is varied until an optimal light sheet is set, i.e. the side lobes of the individual Bessel beams are preferably superimposed destructively, with the result that a light sheet which is long and thin in cross section forms with only small side lobes.

It is understood that the features mentioned above and those yet to be explained in the following are applicable, not only in the stated combinations, but also in other combinations or singly, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Figure 1:
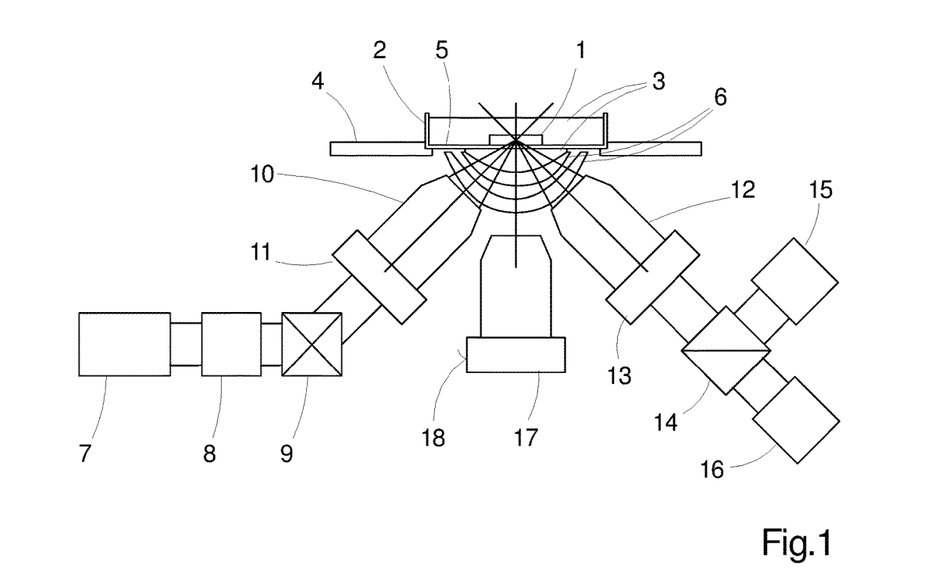
FIG. 1 is a schematic structure of an inverted light sheet microscope.

Firstly, FIG. 1 shows the basic structure of a light sheet microscope which can be used to examine a specimen by means of light sheet microscopy. The light sheet microscope is here shown in an inverse configuration, this is only to be understood by way of example, light microscopes in which the specimen is viewed from above or from the side are also possible embodiments. A specimen 1 is located in a specimen chamber 2 and is surrounded by a liquid 3, for example water or a culture medium. The specimen chamber 2 has side walls and a base made of glass with a predefined thickness, the thickness corresponds for example to that of a usual microscope slide, for example 0.17 mm. The specimen chamber 2 is mounted on a microscope stage 4, the microscope stage is movable manually or by motor in all three spatial directions. The individual elements of the light sheet microscope are arranged underneath the specimen chamber 2, which has a transparent base 5. Between the objectives of the light sheet microscope and the base 5 of the specimen chamber 2 there is a so-called virtual relay 6 with an inner and an outer lens. Between the inner lens of the virtual relay 6 and the base 5 of the specimen chamber there is likewise the liquid 3. Between the inner and the outer lens of the virtual relay 6 there is the surrounding atmosphere, air as a rule, likewise between the outer lens of the virtual relay 6 and the objectives of the light sheet microscope.

The virtual relay 6 serves to compensate for aberrations which form because the optical axes of the illumination and detection objectives are not perpendicular to the base 5 of the specimen chamber 2. Instead of a virtual relay 6 other correction mechanisms such as auxiliary lenses or freeform lenses which are integrated into the objectives can also be used if such a correction occurs.

The illumination beam path is represented on the left-hand side. Light from a laser module 7—for example several lasers of different wavelengths can be accommodated here and a selection can be made between different wavelengths, wherein several wavelengths can also be selected simultaneously—is directed, via a beam-shaping module 8 and a scanning module 9—which, for example, can be used to generate a quasi-static light sheet and/or for angle scanning—onto an illumination objective 10, which images the light sheet into the light sheet plane, which here contains the optical axis of the illumination objective, in the specimen. The focus of the illumination objective 10, i.e. the point at which the light sheet has the thinnest extent, can be shifted with the aid of a drive, for example a piezo drive 11. Alternatively, the microscope stage 4 can also be moved.

An example of a detection beam path is imaged on the right-hand side. It comprises a detection objective 12, which, analogously to the illumination objective 10, can be shifted by means of a drive, here a piezo drive 13. The optical axis of the detection objective 12 forms an angle different from zero, here a right angle, with the light sheet plane in which the optical axis of the illumination objective 10 lies. However, this is not absolutely necessary in order for the process to function, an angle different from zero between the plane of the light sheet and the optical axis of the detection objective 12 is sufficient. Fluorescent light emitted by the specimen 1 is directed onto different detection modules 15 and 16 by the detection objective 12 via a beam splitter 14. In the case of illumination of the specimen simultaneously or quasi-simultaneously with a light sheet comprising several wavelengths, for example, the detection can be carried out differently according to the wavelengths. In the detection modules 15, 16 there are as a rule laminar detectors, which record the intensity and convert it into a corresponding electrical signal which is then integrated into an image processing. The arrangement for light sheet microscopy is completed by an overview objective 17, which can be moved via a piezo drive 18. The overview objective 17 serves firstly to capture an overview of the specimen and to select a region of interest (ROI), onto which illumination and detection can then be focussed.

Figure 2:
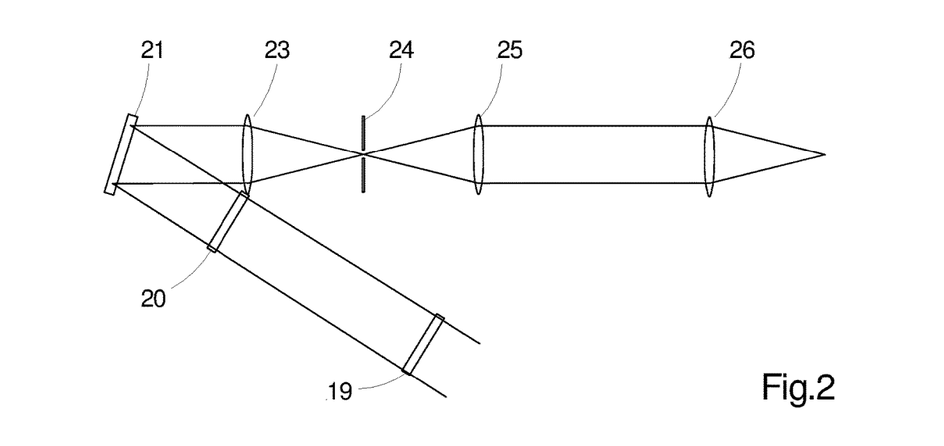
FIG. 2 is a first design of a beam-shaping module.
Figure 3:
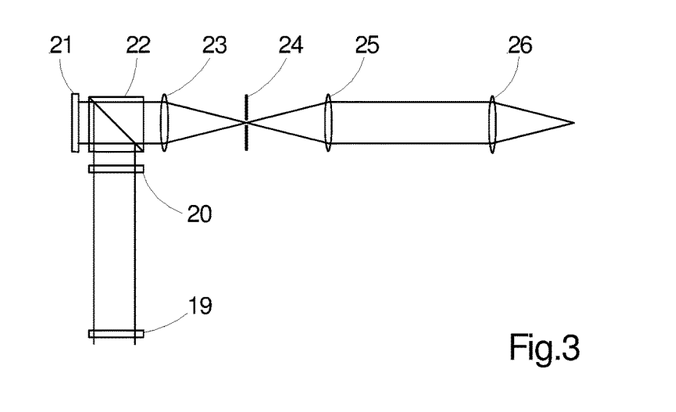
FIG. 3 is a second form of a beam-shaping module.

Various beam-shaping modules are represented in FIGS. 2 to 5. In the case of the beam-shaping module shown in FIG. 2, a Gaussian laser beam is collimated. In the example shown, for this two cylindrical lenses 19 and 20 are used, in this way a collimated elliptical laser beam is obtained instead of a rotationally symmetrical laser beam, as was obtained when rotationally symmetrical lenses were used; the latter is of course also possible. However, an elliptically collimated beam offers advantages for the light sheet shaping, as the shape is already, if anything, adapted to a light sheet and not as much intensity flows into the zero order as would be the case with rotationally symmetrical beams. The elliptically collimated light beam strikes a phase-selective element, here a nematic SLM 21, at an angle, i.e. the angle that the normal of the surface of the nematic SLM 21 forms with the optical axis of the cylindrical lenses 19 and 20 is different from zero. Alternatively, a beam splitter 22 can also be used, this is shown in FIG. 3.

The nematic SLM 21 is arranged in or close to an intermediate image plane in the illumination beam path and is illuminated with the illumination light, the collimated light beam. The illumination light is structured by the phase-selective element, the nematic SLM 21. It is to be preferred if the phase-selective element is in the intermediate image plane, otherwise the light sheet generated comprises a defocussing. This would then have to be compensated for by additional lens elements or else directly by adapting the phase distribution to the phase-selective element by superimposition with a corresponding correction phase pattern.

Figure 5:
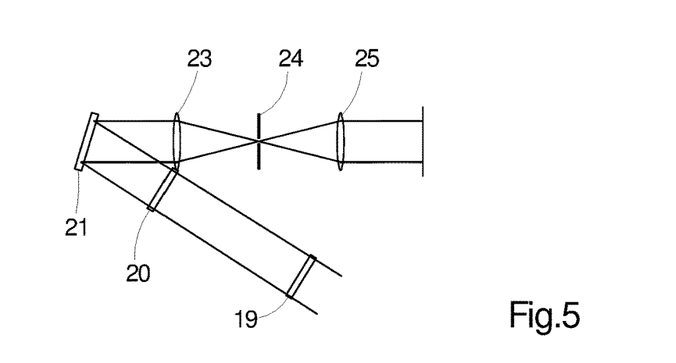
FIG. 5 is a fourth form of a beam-shaping module,
FIG. 6 are diagrams of individual steps of the light sheet generation with a beam-shaping module according to FIG. 5.

Via a lens 23 the structured illumination light is imaged into an aperture plane arranged downstream of the phase-selective element, the lens 23 generates, in the aperture plane in which an aperture 24 is located, the Fourier transform of the illumination light, i.e. the frequency spectrum of the beam. The aperture 24 can be used to perform a spectral filtering of the beam, but in particular serves to substantially remove a zero order of the structured light in the aperture plane. In the focal plane of the downstream illumination objective 10 a structured light sheet is thereby formed with a light sheet plane which is perpendicular to the focal plane of the illumination objective 10. The lenses 25 and 26 then image the frequency spectrum, for example, onto a scanning mirror, not shown, which can be used to generate a quasi-static light sheet. Alternatively, a direct imaging of the beam into the illumination objective 10 can also be effected, if the lens 26 is not used. This is shown in FIG. 5.

The specimen 1 is then illuminated with the structured light sheet in the light sheet plane, light emitted by the specimen is detected in a detection direction which forms an angle different from zero with the light sheet plane, as described in connection with FIG. 1.

Figure 4:
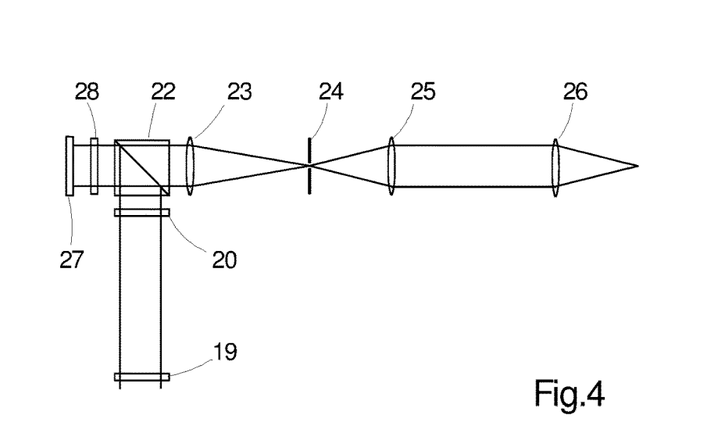
FIG. 4 is a third form of a beam-shaping module.

Instead of a nematic SLM 21, a ferroelectric SLM 27 with upstream λ/2 plate 28 can also be used, this is shown in FIG. 4. As, after the adjustment of the SLM or of the phase-selective element, the properties thereof are not altered during operation, instead of an SLM a static phase-selective element—for example a phase plate—can also be used, but an SLM can more easily be adapted to different conditions—such as for example different beam shapes or different wavelengths—as it is controllable, while a phase plate would then have to be replaced.

In order to prepare the beam shaping module for use to illuminate the specimen 1 with a multi-coloured light sheet of different wavelengths, the phase-selective element is previously impressed with a predefined phase distribution, likewise the aperture in the aperture plane is impressed with a predefined aperture structure. This is to be described by way of example in the following for $sinc^3$ beams without limiting the generality, since other beam shapes can also be used.

In a first step several—at least two—illumination wavelengths are first selected, of which illumination light for the specimen 1 is to be composed. As the phase deviation of the phase-selective element, and in particular of an SLM, is dependent on the wavelength, for a middle wavelength the modulation depth of the phase-selective element is fixed at $\pi$. The middle wavelength does not have to match one of the illumination wavelengths, but as a rule corresponds to the average of the longest and the shortest illumination wavelengths. A weighted averaging which takes into account the position of the individual wavelengths in the wavelength range between the longest and the shortest wavelengths in the sense of determining a focal point can also be performed to determine the middle wavelength. If, for example, the wavelengths 400 nm, 500 nm and 600 nm are to be used to generate the multi-coloured light sheet, the phase-selective element is accordingly set for the middle wavelength of 500 nm. In the case of shorter wavelengths the phase deviation is then greater than $\pi$ and in the case of longer wavelengths the phase deviation is smaller than $\pi$. The desired phase deviation is set in the case of an SLM using control voltages as a rule. If, by way of example, a phase deviation of $\pi$ is set for a wavelength of 500 nm, in the case of the other wavelengths used in the example a phase deviation of $1.6\pi$ results at 400 nm and a phase deviation of $0.9\pi$ results at 600 nm.

If the modulation depth is set, the phase-selective element is impressed with a predefined phase structure. For this, a preferred wavelength is first selected. The preferred wavelength comprises at least a wavelength corresponding to the longest illumination wavelength, but it can also be even longer. In the present example the preferred wavelength is 600 nm. The adjustment described above and in the following is only carried out for this wavelength. The position of the frequency spectrum of the shaped beam is adapted for this wavelength such that it lies at the edge of the pupil, thus such that no impairment of the light sheet occurs.

Of course, it is also possible to choose another preferred wavelength outside of the wavelength range, but this then has the disadvantage that the precision when the light sheet is generated may be reduced. However, it is not ruled out that the preferred wavelength itself is not used for the illumination, thus is not an illumination wavelength.

In order to make the adjustment easier, the SLM can optionally be fully illuminated. In the aperture plane of the aperture 24 the central region is first carefully faded out at least for the preferred wavelength, i.e. the zero order of the structured light is substantially removed in the aperture plane, as otherwise a structured light sheet cannot be generated.

In the focal plane of the illumination objective 10 an electric superimposition field is then determined from the superimposition of at least two light beams of predefined shape with light of the preferred wavelength. For the present example, a $sinc^3$ beam is to be used as the light beam, i.e. in the focal plane at least two $sinc^3$ beams are coherently superimposed, but other beam shapes can also be used, including Gaussian beams.

The superimposition field resulting in the focal plane because of the superimposition is as a rule determined arithmetically. This can be effected for example with the aid of the so-called pupil function. In the next step the phase distribution in the focal plane of the illumination objective 10 is determined, this is effected by applying the "arg" function to the complex electric superimposition field. Optionally this phase distribution can still be multiplied by an envelope function which limits the light sheet to the top and the bottom, perpendicularly to the light sheet plane.

The phase distribution calculated in such a manner then corresponds to the phase distribution to be predefined and is impressed on the phase-selective element, for example an SLM, i.e. is represented on the latter.

Optionally a scaling can then be carried out with respect to the size, i.e. the two-dimensional extent, of the phase distribution on the phase-selective element, with the result that the spectrum in the pupil corresponds to the initially calculated spectrum, or with the result that the light sheet in the specimen has correspondingly predefined dimensions, which for example correlate with the size of the specimen.

While the aperture 24 has until then only removed a middle or central region around the optical axis, which as a rule does not correspond exactly to the zero order of the coherently superimposed, diffracted illumination light of the preferred wavelength, the aperture structure of the aperture 24 is now adapted such that as far as possible precisely the zero order for the preferred wavelength is removed and in addition also for the, or the other, illumination wavelengths of the illumination light. In addition the aperture structure can also be adapted such that undesired side lobes of the pupil function are removed.

The collimation of the input beam striking the SLM or the phase-selective element, made of light of the illumination wavelengths, is then also adapted. If an elliptical collimation is used, the adaptation should be effected to the effect that the output in the diffracted zero order is as small as possible and the light sheet is not influenced at the same time. Alternatively, the phase-selective element can also be illuminated with a rectangular function or uniformly, wherein however the majority of the irradiated light is then diffracted into the zero order, which must be filtered out, as otherwise no light sheet can be generated. An elliptically collimated, Gaussian intensity distribution can, for example, also be achieved by multiplying the phase distribution by a one-dimensional envelope function, for example an exponential function. The multiplication by an envelope function can thus be used as an alternative to the optical, elliptical collimation of the input beam, or else also in combination.

Figure 6:
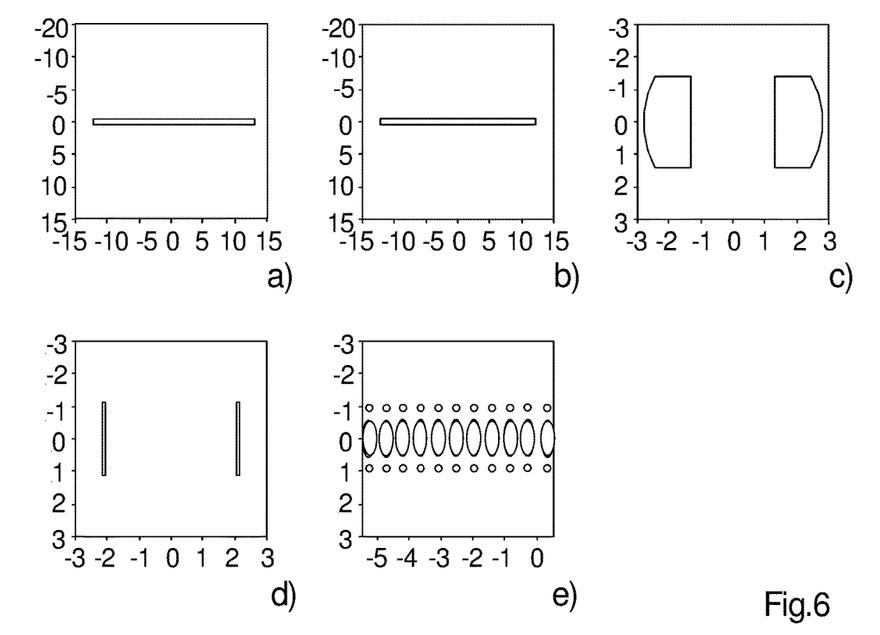

FIG. 6 shows how these measures operate. In FIG. 6a the intensity is represented on an SLM, if the latter is illuminated with an elliptically collimated Gaussian beam. Only the narrow region in the middle is illuminated. Accordingly, the phase distribution on the SLM shown in FIG. 6b is also different from zero only in the middle region, in which it varies. The region here marks the envelope function, outside of which the phase distribution is zero, i.e. the phase is not altered. In the aperture plane the aperture 24 then has the aperture structure, shown in FIG. 6c, for a monochromatic $sinc^3$ light sheet. In the aperture plane with the aperture 24 the intensity distribution shown in FIG. 6d results and in the focal plane of the illumination objective 10 the structured light sheet shown in cross section in FIG. 6e results, wherein the y-axis corresponds to the detection direction.

If the SLM or the phase-selective element is illuminated uniformly, up to 98% of the incident light is diffracted into the zero order and thus is no longer available for the light sheet intensity. The phase-selective element is therefore preferably illuminated, as described, with an elliptically collimated beam with a Gaussian intensity profile. The beam should have approximately the dimensions of the phase distribution on the SLM. If the phase distribution is multiplied by an envelope function, e.g. a Gaussian function, this has a direct effect on the shape of the light sheet. The wider the Gaussian function is, the thinner the light sheet becomes. However, the side lobes are then correspondingly more pronounced. On the other hand, the narrower the Gaussian function chosen is, the more light is diffracted into the zero order in the case of constant illumination. To this extent it is advantageous not to multiply the phase distribution by an envelope function, but to adapt the illumination of the phase-selective element directly. In this way an identical identity distribution in the specimen can be achieved. The advantage is that the proportion of the energy diffracted into the zero order is extremely small, as a rule not higher than 10%.

Instead of using superimposed $sinc^3$ beams for the illumination, light beams of another predefined shape, for example Bessel beams, can also be used. For this the electric superimposition field is determined by using a Bessel beam of a predefined shape as the light beam, determining the electric field of the Bessel beam in the focal plane and arithmetically determining a superimposition of this electric field and identical electric fields spaced apart from each other in each case by a predefined amount A in the focal plane of the illumination objective 10. The distance $\Delta$ is varied until an optimal light sheet is set. Otherwise the process is as in the case of the generation of a structured light sheet from the superimposition of $sinc^3$ beams.

As the adjustment was only carried out for the longest wavelength—here the preferred wavelength of 600 nm—the position of the shaped beam composed of several colours is then adapted such that the phase distribution represented on the phase-selective element for the shorter wavelengths corresponds to a $sinc^3$ beam with a smaller numerical aperture than that used for the adjustment, consequently the frequency spectrum of the corresponding beam lies further inside the pupil, which applies analogously to Bessel beams.

Figure 7:
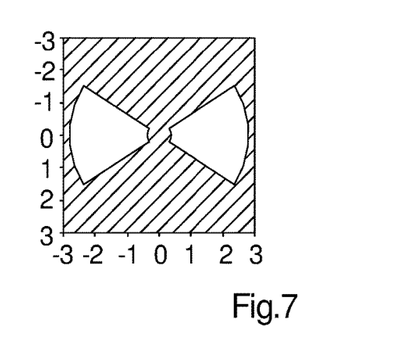
FIG. 7 is a first aperture structure.
Figure 8:
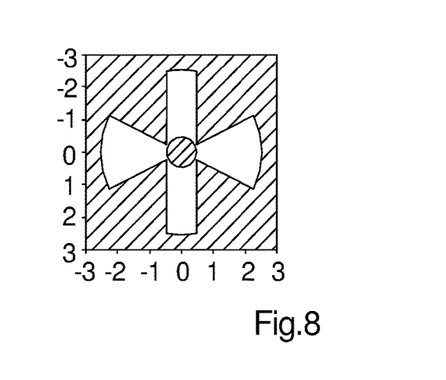
FIG. 8 is a second aperture structure.

In the case of a phase deviation of $\pi$ the diffraction efficiency is at its highest and the entire incident laser radiation is redistributed into the $sinc^3$ or Bessel beam. In the case of a modulation depth deviating from this the diffraction efficiency decreases and a part of the laser output is redistributed into the zero order. If there is no phase deviation or a phase deviation by a multiple of $2\pi$, the entire laser output is diffracted into the zero order, with the result that no $sinc^3$ beam or Bessel beam is generated. If the zero order is filtered out with the aperture 24, the $sinc^3$ light sheet is—irrespective of the output—independent of the modulation depth of the phase distribution. In the present example, the diffraction efficiency is 30% at the wavelength of 400 nm, 85% at the wavelength of 500 nm and 78% at the wavelength of 600 nm. Although the modulation depth at the middle wavelength of 500 nm was set to $\pi$, the diffraction efficiency is not 100%, but only 85%. This is due to the fact that the illumination with an elliptical Gaussian beam only represents an approximation which can be generated well in a real structure. In order to achieve a diffraction efficiency of 100%, not only the phase, but also the intensity of the calculated light sheet would have to be represented on the SLM. However, this is only to be accomplished by extreme technical outlay. Adapted apertures for use with multi-coloured light sheets are shown for $sinc^3$ beams in FIG. 7 and for Bessel beams in FIG. 8.

LIST OF REFERENCE NUMBERS

1 Specimen
2 Specimen chamber
3 Liquid
4 Microscope stage
5 Transparent base
6 Virtual relay
7 Laser module
8 Beam-shaping module
9 Scanning module
10 Illumination objective
11 Piezo drive
12 Detection objective
13 Piezo drive
14 Beam splitter
15, 16 Detection module
17 Overview objective
18 Piezo drive
19, 20 Cylindrical lenses
21 Nematic SLM
22 Beam splitter
23 Lens
24 Aperture
25, 26 Lens
27 Ferroelectric SLM
28 $\lambda/2$ plate While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A method for examining a specimen via light sheet microscopy, comprising:
   selecting several illumination wavelengths, which comprise an illumination light for the specimen;
   fixing a modulation depth of a phase-selective element at π for a middle wavelength;
   impressing a phase-selective element with a predefined phase distribution
   impressing an aperture in an aperture plane with a predefined aperture structure, including:
      selecting a preferred wavelength of light which comprises at least a wavelength corresponding to the longest illumination wavelength,
      determining in the focal plane of an illumination objective an electric field for a light sheet of predefined shape with the preferred wavelength of light,
      calculating a predefined phase distribution of the preferred wavelength of light, wherein a middle region is removed in the aperture plane, such that the aperture structure removes a zero order of the structured light of the preferred wavelength;
   illuminating the phase-selective element in or close to an intermediate image plane in an illumination beam path with the illumination light;
   structuring the illumination light by the phase-selective element;
   imaging the structured illumination light into an aperture plane arranged downstream of the phase-selective element, in which a frequency spectrum of the illumination light is generated;
   adapting the aperture structure such that the zero order of the structured illumination light in the aperture plane are substantially removed, whereby in a focal plane of the downstream illumination objective a structured, multi-coloured light sheet is formed, with a light sheet plane which is oriented perpendicular to the focal plane of the illumination objective;
   illuminating the specimen with the structured light sheet in the light sheet plane; and
   detecting light emitted by the specimen in a detection direction which forms an angle different from zero with the light sheet plane.

2. The method of claim 1, wherein the electric field of the light sheet is determined by coherently superimposing at least two $sinc^3$ beams in the focal plane of the illumination objective to shape the light sheet, and the method further comprising calculating the electric field resulting in the focal plane.

3. The method of claim 1, wherein the electric field of the light sheet is determined by using Bessel beams of a predefined shape to shape the light sheet, the method further comprising determining the electric field of such a Bessel beam in the focal plane, and arithmetically determining a superimposition of the electric field of the Bessel beam and identical electric fields spaced apart from each other in each case by a predefined amount in the focal plane.

4. The method of claim 1, wherein the aperture structure removes a side lobe in the aperture plane.

5. The method of claim 1, further comprising shaping the illumination light into a beam with an intensity profile corresponding to a Gaussian distribution, which is elliptically collimated, before striking the phase-selective element.

6. The method of claim 1, wherein a diffractive optical element is used as the phase-selective element.

7. The method of claim 6, wherein a spatial light modulator is used as diffractive optical element.

8. The method of claim 1, wherein the middle wavelength is an average of a longest and a shortest of the illumination wavelengths.

9. The method of claim 1, wherein the middle wavelength is a wavelength at a highest diffraction efficiency.

* * * * *

UNITED STATES PATENT AND TRADEMARK OFFICE
CERTIFICATE OF CORRECTION

PATENT NO. : 10,247,934 B2
APPLICATION NO. : 15/537424
DATED : April 2, 2019
INVENTOR(S) : Thomas Kalkbrenner et al.

Page 1 of 1

It is certified that error appears in the above-identified patent and that said Letters Patent is hereby corrected as shown below:

In the Specification

Column 6, Line 51: Delete "by a predefined amount A in the focal plane is arithmetically" and replace with --by a predefined amount $\Delta$ in the focal plane is arithmetically--.

Column 11, Line 56: Delete "other in each case by a predefined amount A in the focal" and replace with --other in each case by a predefined amount $\Delta$ in the focal--.

Column 12, Line 56: Delete "28 $\Delta$/2 plate" and replace with --28 $\lambda$/2 plate--.

Signed and Sealed this
Eleventh Day of February, 2020

Andrei Iancu
*Director of the United States Patent and Trademark Office*